April 21, 1964 R. K. LEWIS 3,129,525
BOW CASTING DEVICE
Filed Nov. 22, 1961 2 Sheets-Sheet 1
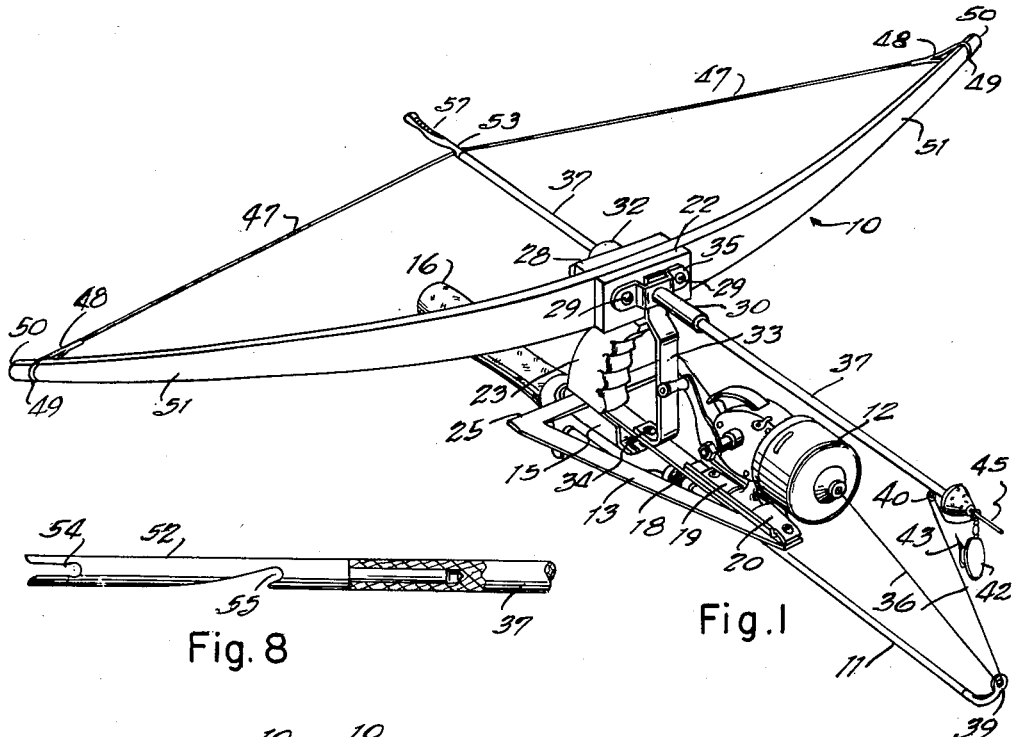
Fig. 8
Fig. 1
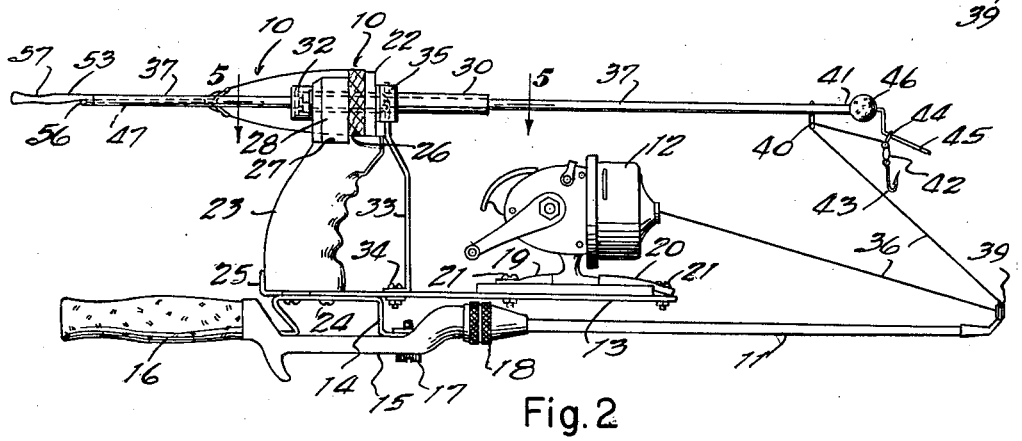
Fig. 2
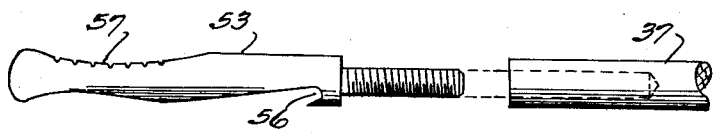
Fig. 3
INVENTOR
Roy K. Lewis
BY
ATTORNEY

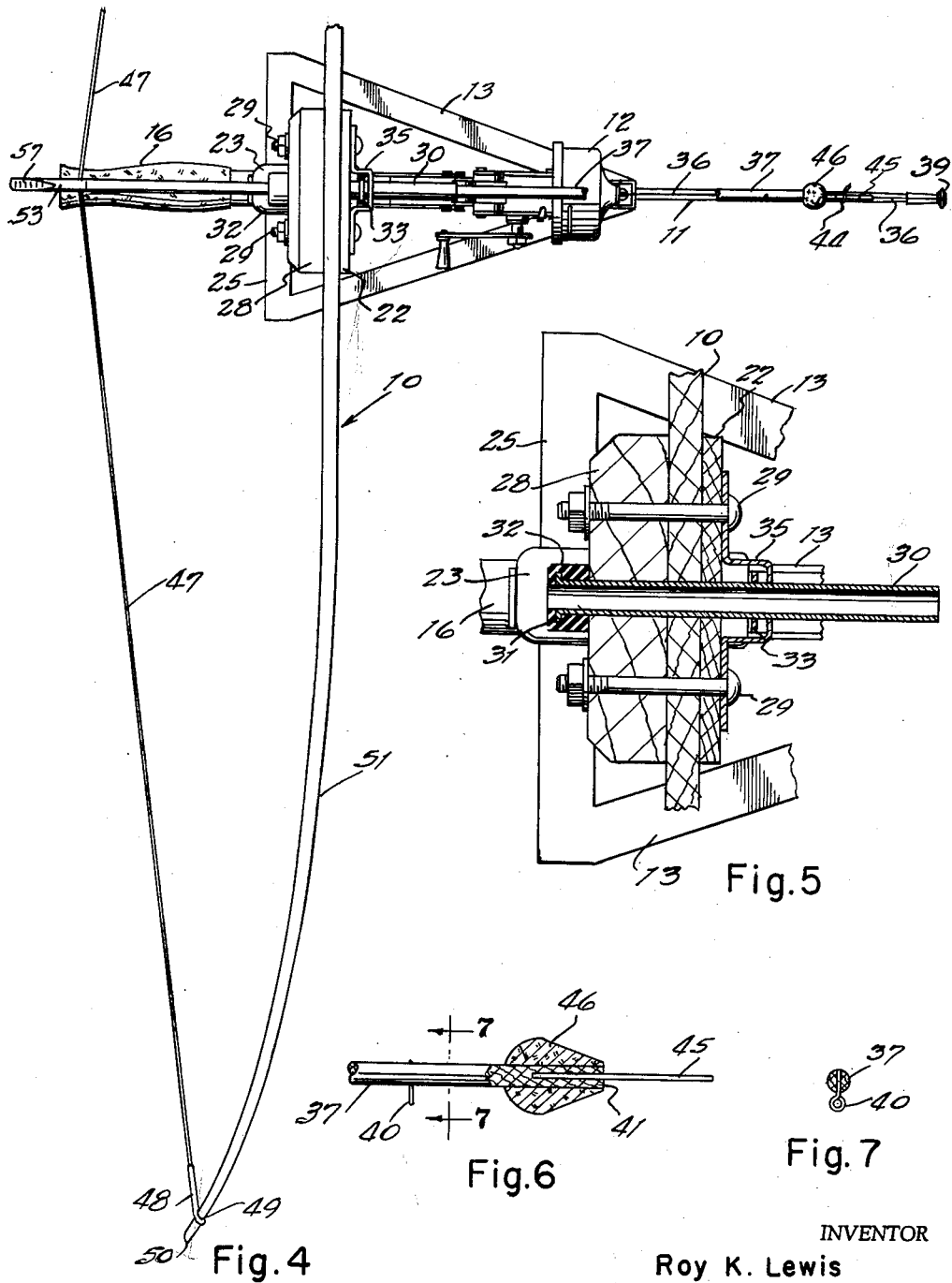

United States Patent Office 3,129,525
Patented Apr. 21, 1964

3,129,525
BOW CASTING DEVICE
Roy K. Lewis, 3530 Cedar Springs, Dallas, Tex.
Filed Nov. 22, 1961, Ser. No. 154,197
2 Claims. (Cl. 43—19)

This invention relates to casting apparatus for fishing lines, and it has particular reference to devices by which a fishing lure can be projected by a stringed bow, and the principal object of the invention resides in the provision of a fishing rod, having a reel thereon for a fishing line, operatively attached to a stringed bow by which the line can be projected on a shaft to which it is attached.

An object of the invention is that of providing a casting device for fishing lines by which the lure can be projected at greater distances and more accurately than is generally possible in conventional rod casting.

Still another object of the invention resides in the provision of a fishing line carrier shaft adapted to be projected by a bow string and capable of remaining afloat until the lure is retrieved by a conventional reel attached to the bow.

Another object of the invention is that of providing a projector for a fishing line, propelled by a stringed bow, on which is provided a convenient hand gripping device by which the bow and the line reel can be easily handled while projecting the lure and reeling in the line.

Broadly, the invention contemplates the provision of a bow casting device for fishing lines by which the lure can be accurately aimed and projected with a substantial thrust whereby the lure can be placed at desired distances and remote locations by persons not generally skilled in the art of hand casing with the conventional rod and reel.

While the foregoing objects are paramount, other and lesser objects will become manifest as the description proceeds taken in connection with the appended drawings wherein:

FIGURE 1 is a perspective illustration of the invention showing the lure carrier shaft in position through the bow and engaging the bow string which is in drawn position, the bow being flexed.

FIGURE 2 is a left side elevational view of the invention showing the shaft, the line rod and reel, the grip handle, the shaft being shown in drawing position on the bow string.

FIGURE 3 is an elevational exploded view of one form of gripping tip for the shaft, the latter being detached therefrom.

FIGURE 4 is an enlarged plan view of the frame supporting the rod and reel, and fragmentarily showing the bow and string, and showing the shaft in tensed position.

FIGURE 5 is a fragmentary horizontal sectional view through the shaft tube and bow, on line 5—5 of FIGURE 2, and showing the manner of supporting the shaft guide tube.

FIGURE 6 is a longitudinal sectional view through the buoyant shaft tip, the shaft being fragmentarily shown.

FIGURE 7 is a transverse sectional view, on line 7—7 of FIGURE 6, through the shaft, and FIGURE 8 is an elevational view of a modified grip tip for the shaft, the latter being fragmentarily shown in partial section.

The invention is characterized by the combination of an archer's bow 10 with a fishing rod 11 on which a conventional type reel 12 is mounted, as illustrated in FIGURES 1, 2 and 3 of the drawings. A triangular frame 13, which lies normally in a horizontal plane, supports the rod 11 through a bracket 14 secured to the shank portion 15 of the handle 16 of the rod 11 by a knurled screw 17 arranged through the forward end of the bracket 14, as shown more clearly in FIGURE 2. The rod 11 is detachably secured to the shank 15 by the conventional type of chuck 18.

The reel 12 is secured to the forward end of the frame 13 by clamps 19 and 20 which are fastened by screws 21. The bow 10 is attached at its grip section, intermediate its tips, to a bracket 22 formed on the upper end of a grip handle 23 whose base is secured by screws 24 through the rear bar 25 of the frame 13 and the bracket 14 by which the rod 11 is attached. The handle, 23 is preferably formed of wood or plastic, and its upper end is formed with a transverse flat surface 26 adjacent the bracket 22 providing a seat for the lower edge of the bow 10, as shown in FIGURE 2, and an offset surface 27 adjacent to the surface 26 providing a seat for a block 28 which engages the inner surface or belly of the bow 10 opposite the bracket 22, and elongated bolts 29 are arranged through the bracket 22, the bow 10 and the block 28 to secure the same in a unit, as shown in FIGURE 5.

A cylindrical barrel 30 is arranged through the members 10, 22 and 28 intermediate their ends and extends forwardly therefrom, as in FIGURES 2 and 5, and has an external flange 31 formed on its inner end about which is formed a sleeve 32 of rubber, or similar material, which engages the block 28, in the manner shown in FIGURE 5. The handle 23 is braced forwardly on the frame 13 by a stanchion 33 which is secured at its lower end to the frame 13 by a screw 34 and has its upper end embraced by a clamp 35 which is secured at each end by the bolts 29 to the flange 22 of the handle 23. The barrel 30 extends through the upper end of the stanchion 33 and the clamp 34, as shown in FIGURE 5.

The fishing line 36 is carried by a shaft 37 which is propelled by the bow string 38, as will presently become apparent. The line 36, which is wound upon the reel 12, is passed through an eye 39 on the outer end of the rod 11 and rearwardly and upwardly through an eye 40 near the tip 41 of the shaft 37, as best shown in FIGURES 1 and 2, and a lure 42, having a hook 43 thereon, is releasably supported through its ring 44 on an angular element 45 projecting from the tip 41 of the shaft 37, in the manner shown in FIGURES 1 and 2. A buoyant element 46 is attached to the tip 41 of the shaft 37 to keep the latter afloat.

The bow string 47 is secured at each end by loops 48 to nocks or notches 49 formed on opposite edges of the tips 50 of the limbs 51 of the bow 10. The shaft 37 has interchangeable pull tips 52 and 53, shown in FIGURES 3 and 8, respectively, which are engaged by the bow string 47 in either of the nocks or notches 54 and 55 of the tip 52, or the notch 56 of the tip 53, the latter having a knurled surface 57 by which it may be held when the bow string 47 is drawn, as illustrated in FIGURES 1, 2 and 4. The bow string 47 may advantageously be formed of any suitable elastic material, and the bow 10 may be of any flexible or rigid material, such as wood, metal, or the like.

The shaft 37 is arranged through the barrel 30 which functions to guide the same when the string is released, and enables the operator to grip the handle 23 with one hand while drawing the bow string 47. The lure 42 is adapted to remain attached to the element 45 on the tip 41 of the shaft 37 until the latter contacts the water, whereupon the lure is released and the shaft 37 floats to be retrieved by the reel 12 since it is restrained by the lure 42 which cannot pass through the eye 40. The shaft 37 is inserted through the barrel 30 from its forward end, the pull tip being passed entirely through the barrel 30 and against the bow string 47.

The invention, while described in great detail, is obviously subject to certain changes and modifications in design and structure, without departing from the spirit and intent of the invention or the scope of the appended claims.

What is claimed is:

1. In a fishing line casting device adapted for attachment to a conventional fishing rod having a handle and a reel seat on said handle, in combination, a frame having a supporting bracket detachably secured to said reel seat, the said frame lying in a plane parallel to said rod and extending forwardly of said reel seat, a fishing reel having a line wound thereon mounted on the forward end of said frame above said rod in normal operative position, a line guide mounted on the rod, a grip handle secured to said frame rearwardly of said reel and having its axis perpendicular to said frame, an archer's bow rigidly attached to the upper end of said grip handle and transversely thereof, the said bow being braced by a bow string for projecting a shaft therethrough intermediate its ends, a tubular guide for a shaft extending through said bow, and a shaft in said guide having means on one end for engagement by the bow string and means on its opposite end for attaching a fishing lure connected to said line, the said line passing from the reel thru the line guide to its attachment on the shaft.

2. In a casting device for fishing lures, a unit adapted for attachment to a conventional fishing rod having a handle and a seat for a detachable reel, the combination comprising, a frame having a bracket for detachable securement to said reel seat and having its planar surfaces parallel to and above said rod, a reel having a line wound thereon mounted on said frame forwardly of said seat, a line guide mounted on the rod, a grip handle on said frame and perpendicular to the planar surfaces thereof rearwardly of said reel, an archer's bow braced by a bow string attached to the upper end of said grip handle and transversely of its longitudinal axis, a tubular guide element arranged through said bow intermediate its ends adjacent to the upper end of said grip handle, and a shaft arranged through said guide element and attached to said line and having a fishing lure attached to its tip, the said line passing from the reel thru the line guide to its attachment on the shaft.

References Cited in the file of this patent

UNITED STATES PATENTS

| | | |
|---|---|---|
| 1,457,983 | Malone | June 5, 1923 |
| 2,345,043 | Hall | Mar. 28, 1944 |
| 2,808,043 | Lombard | Oct. 1, 1957 |
| 3,059,370 | Moore | Oct. 23, 1962 |

FOREIGN PATENTS

| | | |
|---|---|---|
| 172 | Great Britain | of 1886 |